US012609567B1

(12) United States Patent
Shaw et al.

(10) Patent No.: US 12,609,567 B1
(45) Date of Patent: Apr. 21, 2026

(54) SELECTIVELY POCKETED BACK IRON FOR AXIAL FLUX MACHINES

(71) Applicant: E-Circuit Motors, Inc., Needham Heights, MA (US)

(72) Inventors: Steven Robert Shaw, Bozeman, MT (US); George Harder Milheim, Bozeman, MT (US)

(73) Assignee: E-Circuit Motors, Inc., Needham Heights, MA (US)

( * ) Notice: Subject to any disclaimer, the term of this patent is extended or adjusted under 35 U.S.C. 154(b) by 0 days.

(21) Appl. No.: 19/358,707

(22) Filed: Oct. 15, 2025

Related U.S. Application Data

(60) Provisional application No. 63/876,187, filed on Sep. 5, 2025.

(51) Int. Cl.
| | |
|---|---|
| *H02K 1/279* | (2022.01) |
| *H02K 1/2795* | (2022.01) |

(52) U.S. Cl.
CPC ........... *H02K 1/2795* (2022.01); *H02K 1/279* (2022.01)

(58) Field of Classification Search
CPC ..... H02K 1/2795; H02K 1/2793; H02K 1/279
USPC ..................................................... 310/156.32
See application file for complete search history.

(56) References Cited

U.S. PATENT DOCUMENTS

| | | | | |
|---|---|---|---|---|
| 6,208,055 | B1 * | 3/2001 | Takahashi | ............ H02K 1/2706 |
| | | | | 310/156.56 |
| 7,109,625 | B1 | 9/2006 | Jore et al. | |

| | | | | |
|---|---|---|---|---|
| 7,608,964 | B2 * | 10/2009 | Yamagiwa | ............... H02K 7/14 |
| | | | | 310/156.32 |
| 7,629,724 | B2 * | 12/2009 | Tanno | .................... H02K 21/24 |
| | | | | 310/156.32 |
| 9,673,688 | B2 | 6/2017 | Shaw | |
| 9,800,109 | B2 | 10/2017 | Shaw | |
| 9,899,886 | B2 | 2/2018 | Sullivan | |
| 10,170,953 | B2 | 1/2019 | Shaw | |
| 10,211,694 | B1 | 2/2019 | Shaw | |
| 10,256,687 | B2 | 4/2019 | Sullivan | |
| 11,005,322 | B2 | 5/2021 | Milheim et al. | |
| 11,121,614 | B2 | 9/2021 | Milheim | |
| 11,336,130 | B1 | 5/2022 | Shaw et al. | |
| 11,527,933 | B2 | 12/2022 | Shaw et al. | |
| 11,626,779 | B2 | 4/2023 | Shaw et al. | |
| 11,751,330 | B2 | 9/2023 | Milheim et al. | |

(Continued)

FOREIGN PATENT DOCUMENTS

| | | |
|---|---|---|
| CN | 202455182 U | 9/2012 |
| CN | 203180673 U | 9/2013 |

(Continued)

*Primary Examiner* — Burton S Mullins
(74) *Attorney, Agent, or Firm* — Pierce Atwood LLP

(57) ABSTRACT

A rotor component for a motor or generator may include a support structure made of a magnetic material, a first magnet, and a second magnet. The first magnet may be attached to a first portion of the support structure to form a first magnetic pole of the motor or generator, and the second magnet may be attached to a second portion of the support structure to form a second magnetic pole of the motor or generator. The magnetic material of the support structure may provide a flux return path from the first magnet to the second magnet via the first portion and the second portion, and the first portion of the support structure may include a first plurality of pocket features that are free of the magnetic material.

30 Claims, 7 Drawing Sheets

(56)                    References Cited

U.S. PATENT DOCUMENTS

| | | | |
|---|---|---|---|
| 2004/0090135 A1 | 5/2004 | Maslov et al. | |
| 2004/0239194 A1 | 12/2004 | Thirunarayan et al. | |
| 2005/0023920 A1 | 2/2005 | Tajima et al. | |
| 2008/0030095 A1 | 2/2008 | Lizuka et al. | |
| 2010/0187934 A1 | 7/2010 | Asano | |
| 2013/0200739 A1 | 8/2013 | Lee et al. | |
| 2014/0054998 A1 | 2/2014 | Kim et al. | |
| 2022/0320920 A1* | 10/2022 | Hirai ..................... | H02K 21/24 |

FOREIGN PATENT DOCUMENTS

| | | |
|---|---|---|
| DE | 102009000216 A1 | 7/2010 |
| JP | 2000184643 A | 6/2000 |
| JP | 2008086166 A | 4/2008 |
| JP | 2010035326 A | 2/2010 |
| JP | 2010093929 A | 4/2010 |
| JP | 2010172094 A | 8/2010 |
| JP | 2010178493 A | 8/2010 |
| JP | 2011072087 A | 4/2011 |

* cited by examiner

SELECTIVELY POCKETED BACK IRON FOR AXIAL FLUX MACHINES

RELATED APPLICATIONS

This application claims the benefit under 35 U.S.C. § 119(e) of U.S. Provisional Application Ser. No. 63/876, 187, entitled SELECTIVELY POCKETED BACK IRON FOR AXIAL FLUX MACHINES, filed Sep. 5, 2025, the entire contents of which are incorporated herein by reference for all purposes.

BACKGROUND

Axial flux motors and generators described by several patents, including U.S. Pat. Nos. 7,109,625; 9,673,688; 9,800,109; 10,170,953; 10,211,694; 11,005,322; 11,121, 614; 11,336,130; 11,527,933; 11,626,779; 11,751,330, the entire contents of which are incorporated herein by reference, feature a generally planar printed circuit board (PCB) stator assembly interposed between magnets magnetized with alternating north-south poles. FIG. 1 illustrates a conventional axial flux machine 100 of this type, in which a PCB stator 106 is held stationary with respect to a housing 108 and bearings 110 allow a rotor (including a shaft 112, back iron components 104, and magnets 102) to rotate with respect to the housing 108.

In the axial flux machine 100, in addition to supporting the magnets 102 relative to the shaft 112, the back iron components 104 provide a high magnetic permeability flux return path such that the magnetic flux from each magnetic pole is directed to its neighboring magnetic pole of opposite polarity. The high permeability flux return path increases the amount of flux from the magnets 102 that intercepts the PCB stator 106 and improves torque capability compared to a design without a back iron. It also reduces flux leakage which may generate electrical current in stationary components as the rotor rotates, producing drag. The back iron component 104 is often made from steel or another material which has high permeability. In some embodiments, the back iron component 104 may be used to resolve the attractive force between the opposing sets of magnets 102. The back iron component 104 must be strong enough to support this without excessive deflection or failure which may lead to contact between the magnets 102 of the rotor and the PCB stator 106.

SUMMARY

In some aspects, the techniques described herein relate to a rotor component for a motor or generator, including: a support structure made of a magnetic material; a first magnet attached to a first portion of the support structure to form a first magnetic pole of the motor or generator; and a second magnet attached to a second portion of the support structure to form a second magnetic pole of the motor or generator; wherein: the magnetic material of the support structure provides a flux return path from the first magnet to the second magnet via the first portion and the second portion, and the first portion of the support structure includes a first plurality of pocket features that are free of the magnetic material.

DETAILED DESCRIPTION

Figure 1:
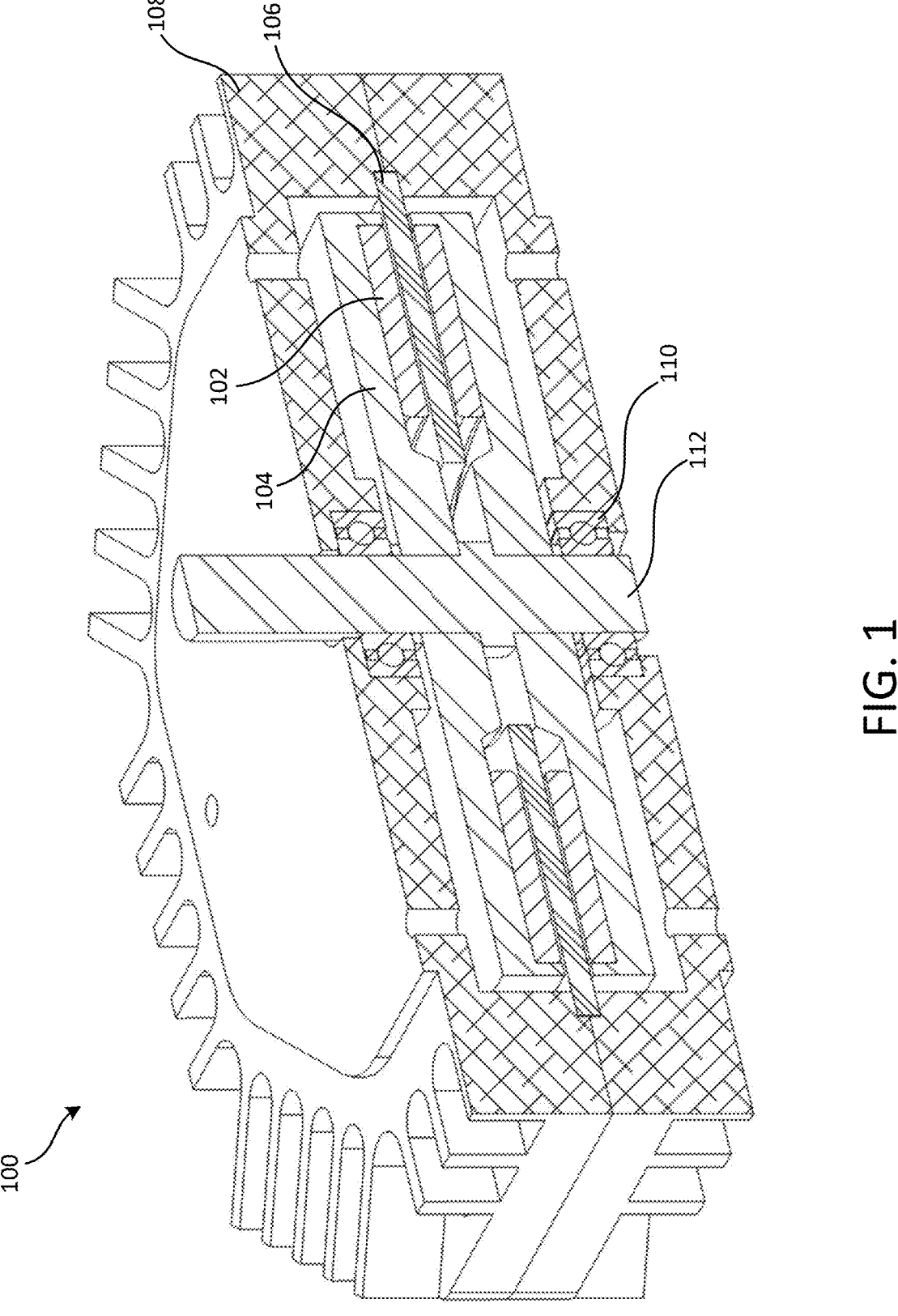
FIG. 1 shows a conventional axial flux machine.
Figure 2:
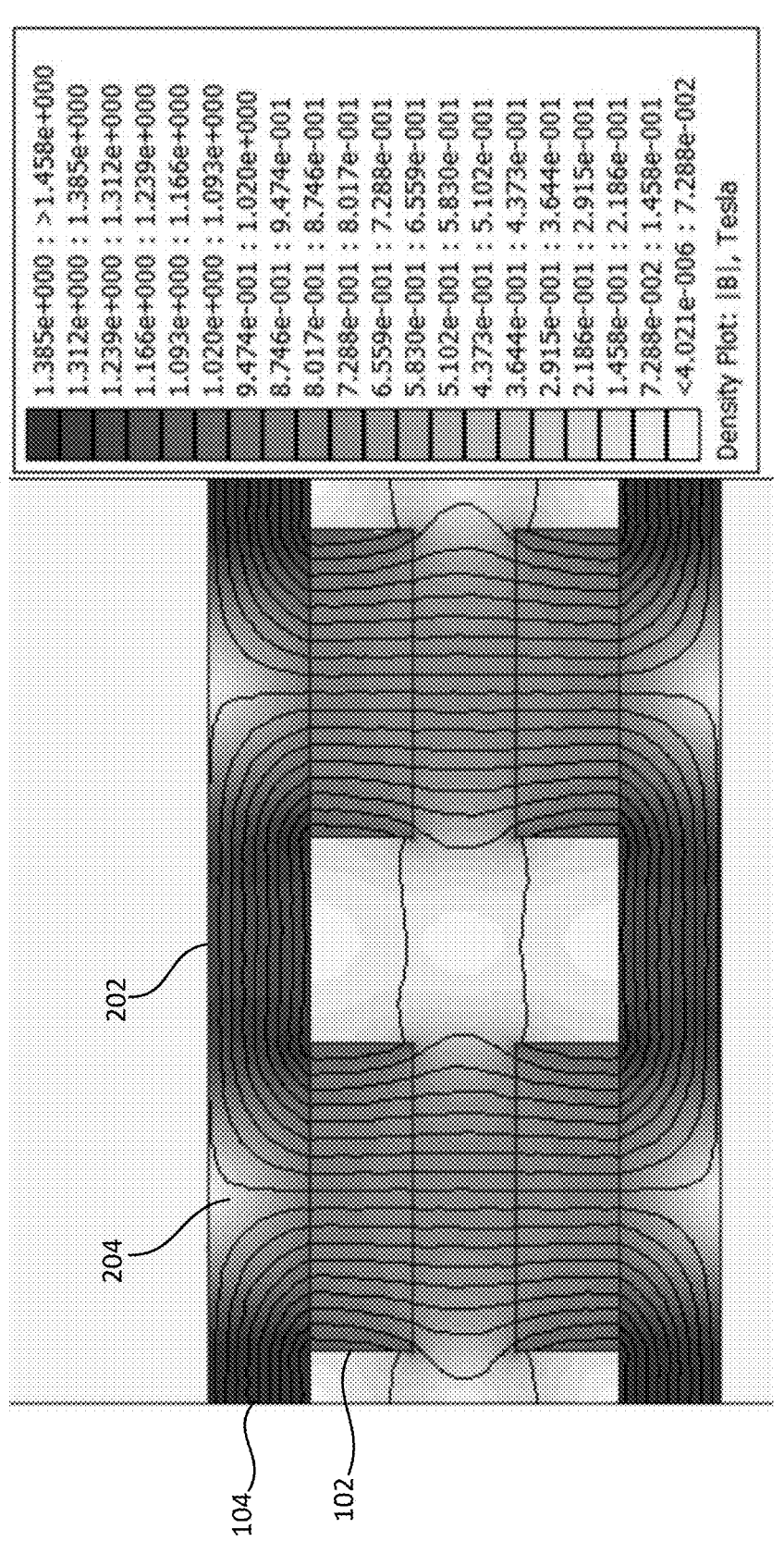
FIG. 2 shows a finite element analysis (FEA) result for a cross section of a conventional rotor showing the low flux density in the steel region over the center of the magnetic poles.

As shown in FIG. 1, the back iron component 104 of a conventional axial flux machine 100 is often disc shaped with a constant thickness. In such devices, the back iron component 104 is a relatively simple part which may be manufactured by stamping, for example. In this constant thickness design, the flux density in the material varies throughout the back iron component 104. FIG. 2 shows a finite element analysis (FEA) result for a conventional back iron component 104 (having a generally uniform thickness) and associated magnets 102. As can be seen, the flux density is highest at locations 202 between the magnetic poles, as approximately half of the flux from each pole must pass in the theta direction to the next pole. The flux density in the back iron component 104 at the locations 204 over the centers of the poles is much lower.

Ferromagnetic materials such as steel have a magnetic permeability which changes depending on the magnetizing field imposed on the material. Magnetic domains in the material tend to align as the magnetizing field increases. When nearly all the domains are aligned, the material reaches saturation, and the flux density does not increase with increasing field. This has the effect of reducing permeability, which in the limit may approach that of air. If the back iron material becomes saturated, it is less effective at returning flux between the magnetic poles. Compared to a configuration in which there is no saturation, there may be flux leakage, increased drag, reduced flux in the gap, and less torque capability due to reduced air-gap flux density seen by the stator 106.

In an optimized design, in particular a design that attempts to use a minimum amount of back iron material, material would be removed such that it is near uniform in flux density in all regions. It would thus be removed over the centers of the poles and increased in the transitions between poles. Previous designs have added protrusions to a thin back iron which cover the transitions between poles. These protrusions, however, can cause increased windage drag as they act as centrifugal fans. They also result in thinner material over the centers of the poles which reduces the stiffness of the back iron. This method is limited in the amount of material that can be removed as the back iron must remain stiff enough to support the magnets with an acceptable deflection.

Figure 3:
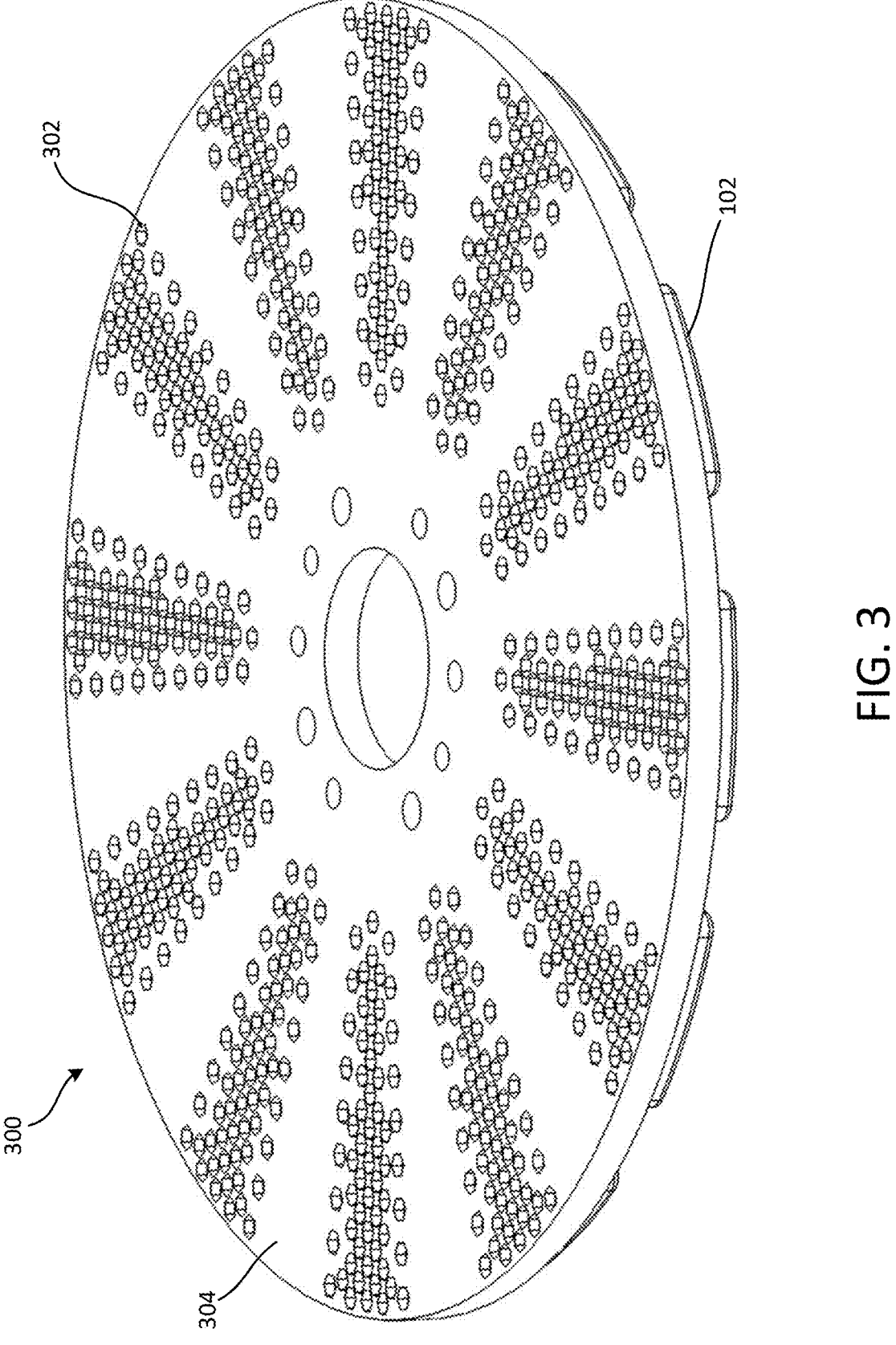
FIG. 3 shows a first example rotor with pocket features, in accordance with some embodiments of the present disclosure.
Figure 4:
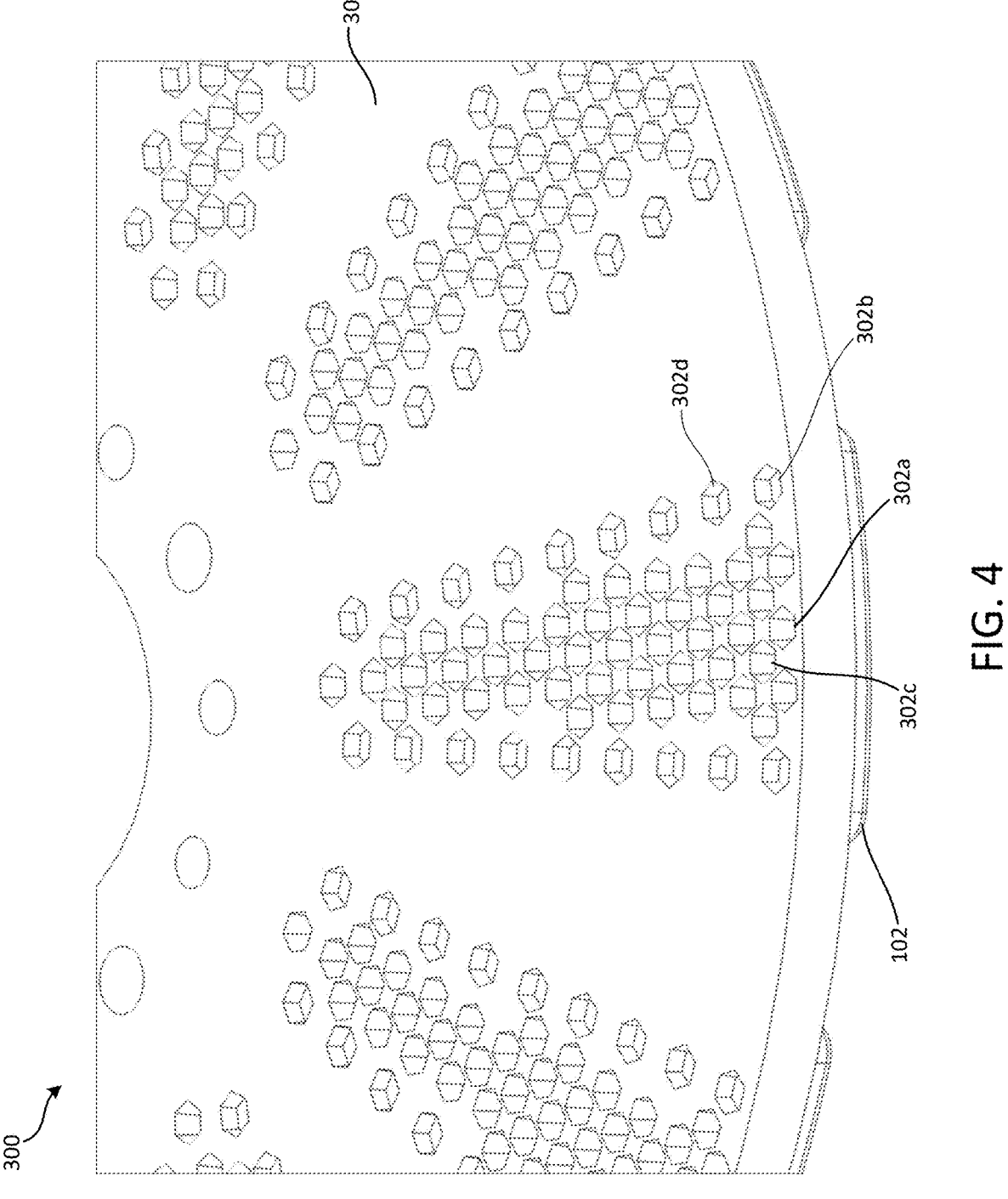
FIG. 4 shows a close up view of the rotor shown in FIG. 3, illustrating how the spacing and depth of pocket features may be varied in some implementations.

The present disclosure describes novel pocket features which may be used to reduce the weight, inertia, and amount of material required for a back iron, but have a low impact on stiffness and windage drag. A first example rotor component 300 having such pocket features 302 formed within a back iron 304 is shown in FIGS. 3 and 4. As can be seen best in FIG. 4, the pocket features 302 may be much smaller than an individual pole corresponding to a magnet 102, leaving portions of the back iron 304 at full thickness. In some implementations, due to the unique configuration of the pocket features 302, the back iron 304 may actually be axially stiffer than a thin sheet of similar cross sectional area. As illustrated, in some implementations, the pocket features 302 may be small and/or may be closed on their outer perimeters such that they do not create drag in the way the protrusions between poles in some prior back iron designs do.

The pocket features 302 may be shaped differently depending on the method used to produce them. In a machined component, they may, for example, be round holes with a conical bottom such that they may be drilled. If the component is cast, they may, for example, be hexagon or triangle shaped such that they nest and stack more efficiently and impart structural integrity to the back iron 304.

In some implementations, the pocket features 302 may vary in size, depth, volume, and/or density to remove the optimal amount of material such that the flux density in the stator and the leakage flux are not significantly changed compared to a solid back iron. As shown in FIG. 4, for example, in the example rotor component 300 that is depicted, a pocket feature 302a, which is positioned directly over a pole, has a greater depth (and volume below a surface of the back iron 304) than a pocket feature 302b, which is positioned closer to a transition between poles. Further, as also shown in FIG. 4, in that same example rotor component 300, pocket features 302a and 302c, which are positioned near a center of a pole, are closer together than pocket features 302b and 302d, which are positioned closer to the transition between poles.

Figure 5:
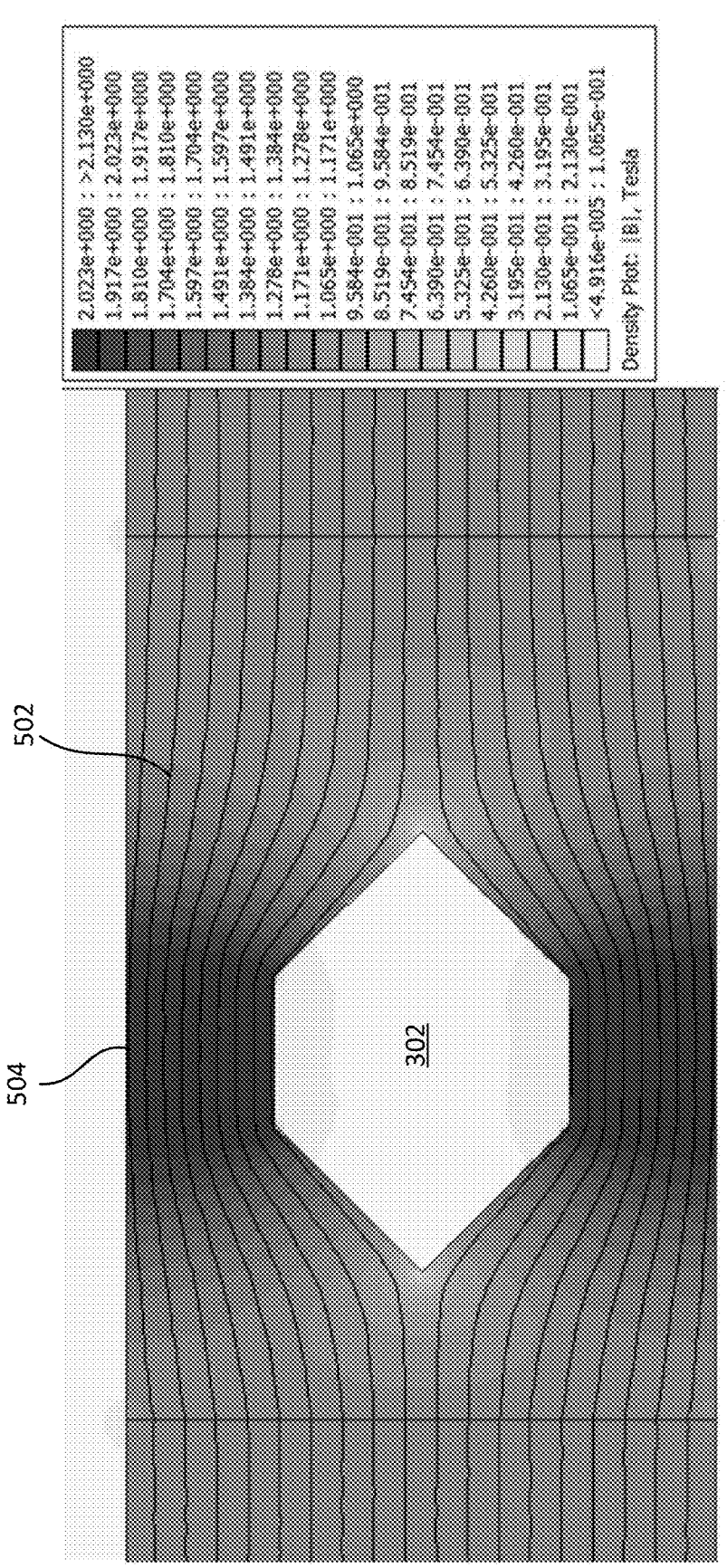
FIG. 5 shows a finite element model showing how flux may bend around an individual pocket features of the type shown in FIGS. 3 and 4.

FIG. 5 shows a finite element analysis (FEA) model showing how flux lines 502 passing in the theta direction through the back iron 304 may bend around an individual, generally hexagonally shaped pocket feature 302 of the type shown in FIGS. 3 and 4, as viewed from above an upper surface of the rotor component 300, with higher concentrations flux appearing in certain regions 504 to account for the interruption in the back iron material created by the depicted pocket feature 302.

Figure 6:
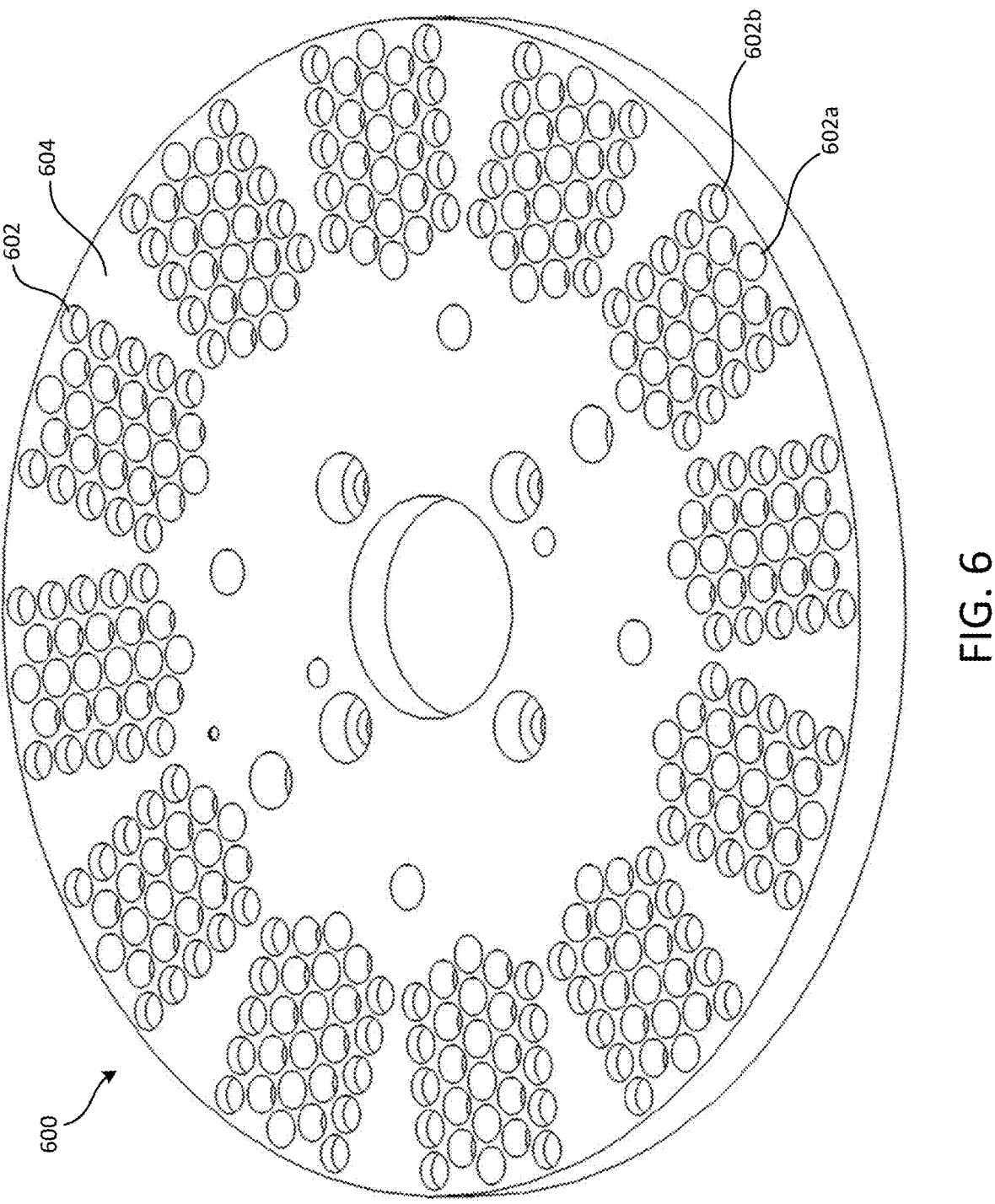
FIG. 6 shows a second example rotor with pocket features, in accordance with some embodiments of the present disclosure.
Figure 7:
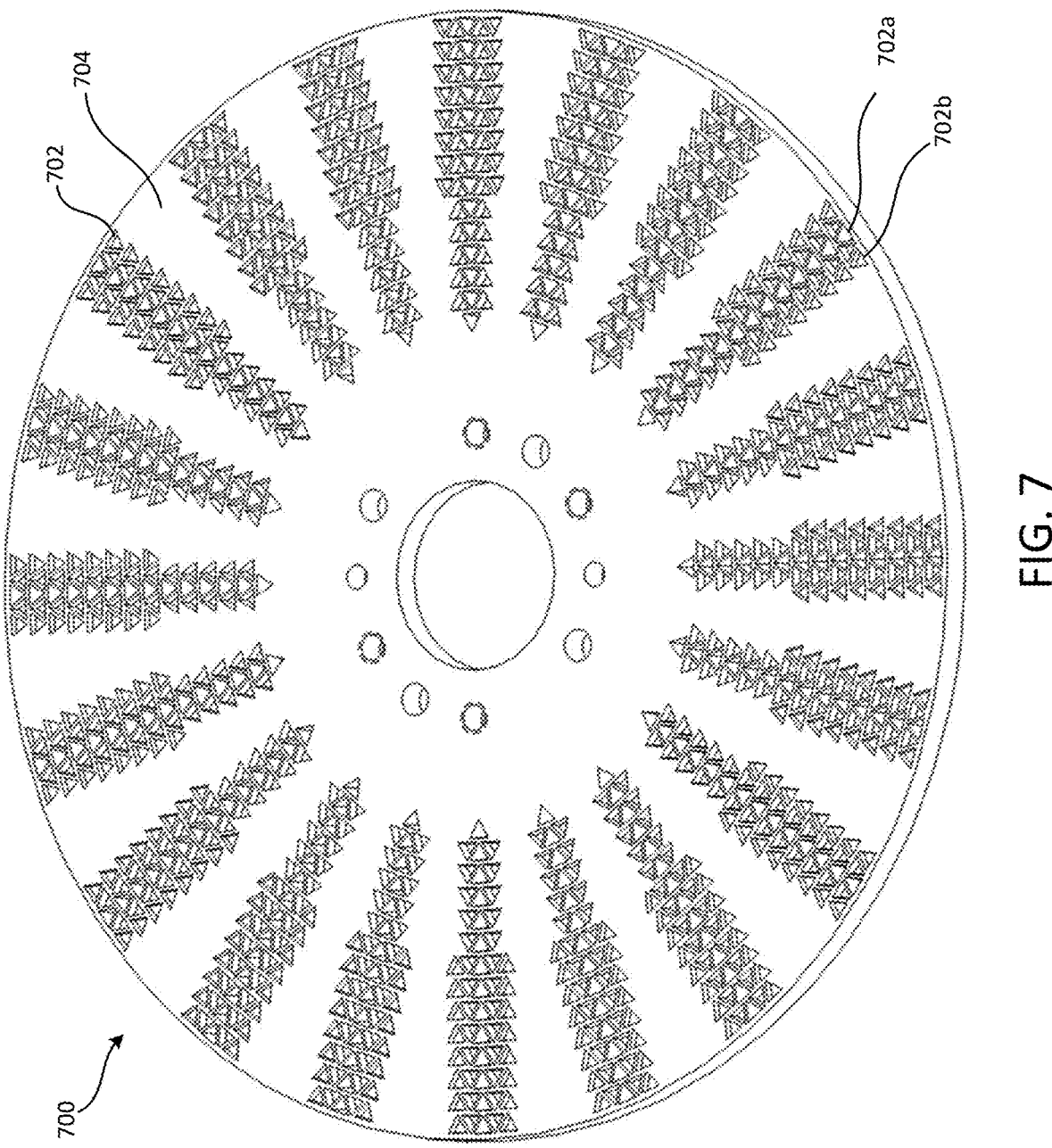
FIG. 7 shows a third example rotor with pocket features, in accordance with some embodiments of the present disclosure.

FIGS. 6 and 7 show second and third example rotor components 600 and 700, respectively, configured in accordance with some implementations of the present disclosure. As can be seen, the rotor component 600 includes circular pocket features 602 formed in a back iron 604 whereas the rotor component 700 includes triangular pocket features 702 formed in a back iron 704. Similar to the pocket features 302 of the rotor component 300, the pocket features 600, 700 of the rotor components 600, 700 may vary in size, depth, volume, and/or density to remove the optimal amount of material such that the flux density in the stator and the leakage flux are not significantly changed compared to a solid back iron. As shown in FIG. 6, for example, in the example rotor component 600 that is depicted, a pocket feature 602a, which is positioned directly over a pole, has a greater depth (and volume) than a pocket feature 602b, which is positioned closer to a transition between poles. Similarly, as shown in FIG. 7, in the example rotor component 700 that is depicted, a pocket feature 702a, which is positioned directly over a pole, has a greater depth (and volume) than a pocket feature 702b, which is positioned closer to a transition between poles.

In a design with protrusions over the pole transitions, the depth of the thinner region over the poles is limited by the flux it must carry in the theta direction. The pocket features 302, 602, 702 disclosed herein may result in a thinner portion of material over the magnets 102 while at the same time allowing the flux to easily bend around the pocket features 302, 602, 702 into the ridges between the pocket features 302, 602, 702 such that this does not impact the magnetic performance of the back iron. Still further, although not depicted in the aforementioned figures, it should be appreciated that the size and/or shape of the perimeters of the pocket features may vary within the same rotor component 300, 600, 700, such as by locating pocket features 302, 602, 702 with larger perimeters and/or hexagon shaped perimeters (e.g., such as the pocket features 302 shown in FIGS. 3 and 4) in regions near the center of poles and locating pocket features 302, 602, 702 with smaller perimeters and/or triangular shaped perimeters (e.g., such as the pocket features 702 shown in FIG. 7) in regions closer to the transitions between poles.

The pocketed rotors disclosed herein may also be employed in machines in which the design of the back iron is limited by stiffness rather than flux return capability. This is common in larger designs with higher pole count. The stiffness may be increased by using a pocketed rotor of larger overall thickness but similar weight to a solid rotor. In this case, pocket features 302, 602, 702 may be present in varying spacing, depth, shape, and/or size in all regions including the pole transitions, as the pocketed structure may have a higher stiffness than a non-pocketed structure of equal weight.

The geometry of the pocket features 302, 602, 702 may be determined by an optimization process which varies the spacing, depth, shape, and/or size of the pocket features 302, 602, 702 in order to optimize the back iron 304, 604, 704 for light weight, low inertia, or a combination of these. The optimization may use finite element analysis to determine the stiffness and flux return performance of designs in an iterative process to achieve the optimal solution.

In some designs, it may be desirable to reduce the roughness of the rotor by filling some or all of the pocket features 302, 602, 702 with a low density material, such as epoxy, or by covering the back side of the rotor component 300, 600, 700 with a thin sheet. This would reduce windage drag of the rotor component 300, 600, 700 by providing a smooth surface to interface with air. One or more pocket features 302, 602, 702 may also be selectively filled, with an epoxy or otherwise, as part of a balancing procedure, common in higher speed machines which use a balancing process to reduce vibration and compensate for manufacturing imperfections.

In a design produced with additive manufacturing, pocket features 302, 602, 702 which are internal to the back iron structure but covered with material on both sides may be included. Such a design would have a high stiffness relative to the weight of the component compared to a design which was solid internally or had pocket structures 302, 602, 702 open on one side.

The following paragraphs describe example implementations of apparatuses in accordance with some aspects of the present disclosure.

In a first example apparatus, a rotor for an axial flux machine has a back iron which returns flux to adjacent magnets and has multiple pocket features placed at or near a center of at least one magnetic pole.

In some implementations of the first example apparatus, the pocket features may vary in spacing.

In some implementations of the first example apparatus, the pocket features may vary in spacing depending on angle.

In some implementations of the first example apparatus, the pocket features may additionally or alternatively vary in spacing in a radial direction.

In some implementations of the first example apparatus, the pocket features may additionally or alternatively vary in size.

In some implementations of the first example apparatus, the pocket features of the first example apparatus may additionally or alternatively vary in size depending on angle.

In some implementations of the first example apparatus, the pocket features may additionally or alternatively vary in size in a radial direction.

In some implementations of the first example apparatus, the pocket features may additionally or alternatively vary in depth.

In some implementations of the first example apparatus, the pocket features may additionally or alternatively vary in depth depending on angle.

In some implementations of the first example apparatus, the pocket features may additionally or alternatively vary in depth in a radial direction.

Additionally or alternatively, in some implementations of the first example apparatus, the pocket feature may have closed perimeters.

Additionally or alternatively, in some implementations of the first example apparatus, at least some of the pocket features may be generally hexagonally shaped.

In a second example apparatus, a rotor component for a motor or generator; comprises: a support structure made of a magnetic material; a first magnet attached to a first portion of the support structure to form a first magnetic pole of the motor or generator; and a second magnet attached to a second portion of the support structure to form a second magnetic pole of the motor or generator; wherein: the magnetic material of the support structure provides a flux return path from the first magnet to the second magnet via the first portion and the second portion, and the first portion of the support structure includes a first plurality of pocket features that are free of the magnetic material.

In some implementations of the second example apparatus, the support structure may include includes a third portion positioned between the first portion and the second portion so that the flux return path from the first magnet to the second magnet passes through the third portion; and the third portion may be generally free of the pocket features.

Additionally or alternatively, in some implementations of the second example apparatus, the second portion of the support structure may include includes a second plurality of pocket features that are free of the magnetic material.

Additionally or alternatively, in some implementations of the second example apparatus, the first plurality of pocket features may include at least a first pocket feature and a second pocket feature; and the first pocket feature may have a greater depth than the second pocket feature.

In some implementations of the second example apparatus of the preceding paragraph, the first pocket feature may be located closer to a center of the first magnetic pole than the second pocket feature.

Additionally or alternatively, in some implementations of the second example apparatus, the first plurality of pocket features may include at least a first pocket feature, a second pocket feature adjacent the first pocket feature, a third pocket feature adjacent the first pocket feature, and a fourth pocket feature adjacent the third pocket feature; and a first distance between the first pocket feature and the second pocket feature may be greater than a second distance between the third pocket feature and the fourth pocket feature.

In some implementations of the second example apparatus of the preceding paragraph, the third pocket feature and the fourth pocket feature may be located closer to a center of the first magnetic pole than the first pocket feature and the second pocket feature.

Additionally or alternatively, in some implementations of the second example apparatus, individual pocket features of the first plurality of pocket features may have closed perimeters at a surface of the first portion.

Additionally or alternatively, in some implementations of the second example apparatus, the first plurality of pocket features may include at least a first pocket feature having a first closed perimeter at a surface of the first portion and a second pocket feature having a second closed perimeter at the surface of the first portion; and the first closed perimeter [is] may be greater than the second closed perimeter.

In some implementations of the second example apparatus of the preceding paragraph, the first pocket feature may be located closer to a center of the first magnetic pole than the second pocket feature.

Additionally or alternatively, in some implementations of the second example apparatus, the first plurality of pocket features may include at least a first pocket feature having a first volume and a second pocket feature having a second volume; and the first volume may be greater than the second volume.

In some implementations of the second example apparatus of the preceding paragraph, the first pocket feature may be located closer to a center of the first magnetic pole than the second pocket feature.

Additionally or alternatively, in some implementations of the second example apparatus, the rotor component may be configured for use in an axial flux motor or generator; the support structure may be an annulus; the first portion [is] may be a first angular portion of the annulus; and the second portion may be a second angular portion of the annulus.

In some implementations of the second example apparatus, the rotor component may be configured for use in an axial flux motor or generator; the support structure may be an annulus; the first portion may be a first angular position of the annulus; the second portion may be a second angular position of the annulus; the first plurality of pocket features may include at least a first pocket feature and a second pocket feature; the first pocket feature may be located at a first angular position within the first angular portion; the second pocket feature may be located at a second angular position, different than the first angular position, within the first angular portion; and the first pocket feature may have a greater depth than the second pocket feature.

In some implementations of the second example apparatus of the preceding paragraph, the first angular position may be closer to a center of the first magnetic pole than the second angular position.

In some implementations of the second example apparatus, the rotor component may be configured for use in an axial flux motor or generator; the support structure may be an annulus; the first portion may be a first angular position of the annulus; the second portion may be a second angular position of the annulus; the first plurality of pocket features may include at least a first pocket feature, a second pocket feature adjacent the first pocket feature, a third pocket feature, and a fourth pocket feature adjacent the third pocket feature; the first pocket feature and the second pocket feature may be located at a first angular position within the first angular portion; the second pocket feature and the third pocket feature may be located at a second angular position, different than the first angular position, within the first angular portion; and a first distance between the first pocket feature and the second pocket feature may be greater than a second distance between the third pocket feature and the fourth pocket feature.

In some implementations of the second example apparatus of the preceding paragraph, the second angular position may be closer to a center of the first magnetic pole than the first angular position.

In some implementations of the second example apparatus, the rotor component may be configured for use in an axial flux motor or generator; the support structure may be an annulus; the first portion may be a first angular position of the annulus; the second portion may be a second angular position of the annulus; the first plurality of pocket features may include at least a first pocket feature having a first closed perimeter at a surface of the first portion and a second pocket feature having a second closed perimeter at the surface of the first portion; the first pocket feature may be located at a first angular position within the first angular portion; the second pocket feature may be located at a second angular position, different than the first angular position, within the first angular portion; and the first closed perimeter may be greater than the second closed perimeter.

In some implementations of the second example apparatus of the preceding paragraph, the first angular position may be closer to a center of the first magnetic pole than the second angular position.

In some implementations of the second example apparatus, the rotor component may be configured for use in an axial flux motor or generator; the support structure may be an annulus; the first portion may be a first angular position of the annulus; the second portion may be a second angular position of the annulus; the first plurality of pocket features may include at least a first pocket feature having a first volume and a second pocket feature having a second volume; the first pocket feature may be located at a first angular position within the first angular portion; the second pocket feature may be located at a second angular position, different than the first angular position, within the first angular portion; and the first volume may be greater than the second volume.

In some implementations of the second example apparatus of the preceding paragraph, the first angular position may be closer to a center of the first magnetic pole than the second angular position.

In some implementations of the second example apparatus, the rotor component may be configured for use in an axial flux motor or generator; the support structure may be an annulus; the first portion may be a first angular position of the annulus; the second portion may be a second angular position of the annulus; the first plurality of pocket features may include at least a first pocket feature and a second pocket feature; the first pocket feature may be located at a first radial distance from a center of the annulus; the second pocket feature may be located at a second radial distance, different than the first radial distance, from the center of the annulus; and the first pocket feature may have a greater depth than the second pocket feature.

In some implementations of the second example apparatus of the preceding paragraph, the first radial distance may be greater than the second radial distance.

In some implementations of the second example apparatus, the rotor component may be configured for use in an axial flux motor or generator; the support structure may be an annulus; the first portion may be a first angular position of the annulus; the second portion may be a second angular position of the annulus; the first plurality of pocket features may include at least a first pocket feature, a second pocket feature adjacent the first pocket feature, a third pocket feature, and a fourth pocket feature adjacent the third pocket feature; the first pocket feature and the second pocket feature may be [are] located at a first radial distance from a center of the annulus; the third pocket feature and the fourth pocket feature may be located at a second radial distance, different than the first radial distance, from the center of the annulus; and a first distance between the first pocket feature and the second pocket feature may be greater than a second distance between the third pocket feature and the fourth pocket feature.

In some implementations of the second example apparatus of the preceding paragraph, the second radial distance may be greater than the first radial distance.

In some implementations of the second example apparatus, the rotor component may be configured for use in an axial flux motor or generator; the support structure may be an annulus; the first portion may be a first angular position of the annulus; the second portion may be a second angular position of the annulus; the first plurality of pocket features may include at least a first pocket feature having a first closed perimeter at a surface of the first portion and a second pocket feature having a second closed perimeter at the surface of the first portion; the first pocket feature may be located at a first radial distance from a center of the annulus; the second pocket feature may be located at a second radial distance, different than the first radial distance, from the center of the annulus; and the first closed perimeter may be greater than the second closed perimeter.

In some implementations of the second example apparatus of the preceding paragraph, the first radial distance may be greater than the second radial distance.

In some implementations of the second example apparatus, the rotor component may be configured for use in an axial flux motor or generator; the support structure may be an annulus; the first portion may be a first angular position of the annulus; the second portion may be a second angular position of the annulus; the first plurality of pocket features may include at least a first pocket feature having a first volume and a second pocket feature having a second volume; the first pocket feature may be located at a first radial distance from a center of the annulus; the second pocket feature may be located at a second radial distance, different than the first radial distance, from the center of the annulus; and the first volume may be greater than the second volume.

In some implementations of the second example apparatus of the preceding paragraph, the first radial distance may be greater than the second radial distance.

Additionally or alternatively, in some implementations of the second example apparatus, at least some of the first plurality of pocket features may be generally hexagonally shaped.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

Various aspects of the present disclosure may be used alone, in combination, or in a variety of arrangements not specifically discussed in the embodiments described in the foregoing and is therefore not limited in this application to the details and arrangement of components set forth in the foregoing description or illustrated in the drawings. For example, aspects described in one embodiment may be combined in any manner with aspects described in other embodiments.

Also, the disclosed aspects may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc. in the claims to modify a claim element does not by itself connote any priority, precedence or order of one claim element over another or the temporal order in which acts of a method are performed, but are used merely as labels to distinguish one claimed element having a certain name from another element having a same name (but for use of the ordinal term) to distinguish the claim elements.

Also, the phraseology and terminology used herein is used for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A rotor component for a motor or generator, comprising:
a support structure made of a magnetic material;
a first magnet attached to a first portion of the support structure to form a first magnetic pole of the motor or generator; and
a second magnet attached to a second portion of the support structure to form a second magnetic pole of the motor or generator;
wherein:
the magnetic material of the support structure provides a flux return path from the first magnet to the second magnet via the first portion and the second portion,
the first portion of the support structure includes a first plurality of pocket features that are free of the magnetic material,
the first plurality of pocket features includes at least a first pocket feature, a second pocket feature adjacent the first pocket feature, a third pocket feature, and a fourth pocket feature adjacent the third pocket feature, and
a first distance between the first pocket feature and the second pocket feature is greater than a second distance between the third pocket feature and the fourth pocket feature.

2. The rotor component of claim 1, wherein:
the support structure includes a third portion positioned between the first portion and the second portion so that the flux return path from the first magnet to the second magnet passes through the third portion; and
the third portion is generally free of the pocket features.

3. The rotor component of claim 2, wherein:
the second portion of the support structure includes a second plurality of pocket features that are free of the magnetic material.

4. The rotor component of claim 1, wherein:
the third pocket feature and the fourth pocket feature have a greater depth than the first pocket feature and the second pocket feature.

5. The rotor component of claim 4, wherein the third pocket feature and the fourth pocket feature are located closer to a center of the first magnetic pole than the first pocket feature and the second pocket feature.

6. The rotor component of claim 1, wherein the third pocket feature and the fourth pocket feature are located closer to a center of the first magnetic pole than the first pocket feature and the second pocket feature.

7. The rotor component of claim 1, wherein individual pocket features of the first plurality of pocket features have closed perimeters at a surface of the first portion.

8. The rotor component of claim 1, wherein the first pocket feature, the second pocket feature, the third pocket feature, and the fourth pocket feature are generally hexagonally shaped.

9. A rotor component for a motor or generator, comprising:
a support structure made of a magnetic material;
a first magnet attached to a first portion of the support structure to form a first magnetic pole of the motor or generator; and
a second magnet attached to a second portion of the support structure to form a second magnetic pole of the motor or generator;
wherein:
the magnetic material of the support structure provides a flux return path from the first magnet to the second magnet via the first portion and the second portion,
the first portion of the support structure includes a first plurality of pocket features that are free of the magnetic material,
the first plurality of pocket features includes at least a first pocket feature having a first closed perimeter at a surface of the first portion and a second pocket feature having a second closed perimeter at the surface of the first portion, and
the first closed perimeter is greater than the second closed perimeter.

10. The rotor component of claim 9, wherein the first pocket feature is located closer to a center of the first magnetic pole than the second pocket feature.

11. The rotor component of claim 9, wherein:
the first pocket feature has a first volume and the second pocket feature has a second volume; and
the first volume is greater than the second volume.

12. The rotor component of claim 11, wherein the first pocket feature is located closer to a center of the first magnetic pole than the second pocket feature.

13. The rotor component of claim 9, wherein the first pocket feature and the second pocket feature are generally hexagonally shaped.

14. A rotor component configured for use in an axial flux motor or generator, comprising:
a support structure made of a magnetic material, the support structure forming an annulus;
a first magnet attached to a first portion of the support structure to form a first magnetic pole of the axial flux motor or generator, the first portion being a first angular portion of the annulus; and
a second magnet attached to a second portion of the support structure to form a second magnetic pole of the axial flux motor or generator, the second portion being a second angular portion of the annulus;

wherein:

the magnetic material of the support structure provides a flux return path from the first magnet to the second magnet via the first portion and the second portion, the first portion of the support structure includes a first plurality of pocket features that are free of the magnetic material, the first plurality of pocket features includes at least a first pocket feature and a second pocket feature, the first pocket feature is located at a first angular position within the first angular portion, the second pocket feature is located at a second angular position, different than the first angular position, within the first angular portion, and the first pocket feature has a greater depth than the second pocket feature.

15. The rotor component of claim 14, wherein the first angular position is closer to a center of the first magnetic pole than the second angular position.

16. The rotor component of claim 14, wherein the first pocket feature and the second pocket feature are generally hexagonally shaped.

17. A rotor component configured for use in an axial flux motor or generator, comprising:

a support structure made of a magnetic material, the support structure forming an annulus;

a first magnet attached to a first portion of the support structure to form a first magnetic pole of the axial flux motor or generator, the first portion being a first angular portion of the annulus; and a second magnet attached to a second portion of the support structure to form a second magnetic pole of the axial flux motor or generator, the second portion being a second angular portion of the annulus;

wherein:

the magnetic material of the support structure provides a flux return path from the first magnet to the second magnet via the first portion and the second portion, the first portion of the support structure includes a first plurality of pocket features that are free of the magnetic material, the first plurality of pocket features includes at least a first pocket feature, a second pocket feature adjacent the first pocket feature, a third pocket feature, and a fourth pocket feature adjacent the third pocket feature, the first pocket feature and the second pocket feature are located at a first angular position within the first angular portion, the second pocket feature and the third pocket feature are located at a second angular position, different than the first angular position, within the first angular portion, and a first distance between the first pocket feature and the second pocket feature is greater than a second distance between the third pocket feature and the fourth pocket feature.

18. The rotor component of claim 17, wherein the second angular position is closer to a center of the first magnetic pole than the first angular position.

19. A rotor component configured for use in an axial flux motor or generator, comprising:

a support structure made of a magnetic material, the support structure forming an annulus;

a first magnet attached to a first portion of the support structure to form a first magnetic pole of the axial flux motor or generator, the first portion being a first angular portion of the annulus; and a second magnet attached to a second portion of the support structure to form a second magnetic pole of the axial flux motor or generator, the second portion being a second angular portion of the annulus;

wherein:

the magnetic material of the support structure provides a flux return path from the first magnet to the second magnet via the first portion and the second portion, the first portion of the support structure includes a first plurality of pocket features that are free of the magnetic material, the first plurality of pocket features includes at least a first pocket feature having a first closed perimeter at a surface of the first portion and a second pocket feature having a second closed perimeter at the surface of the first portion, the first pocket feature is located at a first angular position within the first angular portion, the second pocket feature is located at a second angular position, different than the first angular position, within the first angular portion, and the first closed perimeter is greater than the second closed perimeter.

20. The rotor component of claim 19, wherein the first angular position is closer to a center of the first magnetic pole than the second angular position.

21. A rotor component configured for use in an axial flux motor or generator, comprising:

a support structure made of a magnetic material, the support structure forming an annulus;

a first magnet attached to a first portion of the support structure to form a first magnetic pole of the axial flux motor or generator, the first portion being a first angular portion of the annulus; and a second magnet attached to a second portion of the support structure to form a second magnetic pole of the axial flux motor or generator, the second portion being a second angular portion of the annulus;

wherein:

the magnetic material of the support structure provides a flux return path from the first magnet to the second magnet via the first portion and the second portion, the first portion of the support structure includes a first plurality of pocket features that are free of the magnetic material, the first plurality of pocket features includes at least a first pocket feature having a first volume and a second pocket feature having a second volume, the first pocket feature is located at a first angular position within the first angular portion, the second pocket feature is located at a second angular position, different than the first angular position, within the first angular portion, and the first volume is greater than the second volume.

22. The rotor component of claim 21, wherein the first angular position is closer to a center of the first magnetic pole than the second angular position.

23. A rotor component configured for use in an axial flux motor or generator, comprising:

a support structure made of a magnetic material, the support structure forming an annulus;

a first magnet attached to a first portion of the support structure to form a first magnetic pole of the axial flux motor or generator, the first portion being a first angular portion of the annulus; and a second magnet attached to a second portion of the support structure to form a second magnetic pole of the axial flux motor or generator, the second portion being a second angular portion of the annulus;

wherein:

the magnetic material of the support structure provides a flux return path from the first magnet to the second magnet via the first portion and the second portion, the first portion of the support structure includes a first plurality of pocket features that are free of the magnetic material, the first plurality of pocket features includes at least a first pocket feature and a second pocket feature, the first pocket feature is located at a first radial distance from a center of the annulus, the second pocket feature is located at a second radial distance, different than the first radial distance, from the center of the annulus, and the first pocket feature has a greater depth than the second pocket feature.

24. The rotor component of claim 23, wherein the first radial distance is greater than the second radial distance.

25. A rotor component configured for use in an axial flux motor or generator, comprising:

a support structure made of a magnetic material, the support structure forming an annulus;

a first magnet attached to a first portion of the support structure to form a first magnetic pole of the axial flux motor or generator, the first portion being a first angular portion of the annulus; and a second magnet attached to a second portion of the support structure to form a second magnetic pole of the axial flux motor or generator, the second portion being a second angular portion of the annulus;

wherein:

the magnetic material of the support structure provides a flux return path from the first magnet to the second magnet via the first portion and the second portion, the first portion of the support structure includes a first plurality of pocket features that are free of the magnetic material, the first plurality of pocket features includes at least a first pocket feature, a second pocket feature adjacent the first pocket feature, a third pocket feature, and a fourth pocket feature adjacent the third pocket feature, the first pocket feature and the second pocket feature are located at a first radial distance from a center of the annulus, the third pocket feature and the fourth pocket feature are located at a second radial distance, different than the first radial distance, from the center of the annulus, and a first distance between the first pocket feature and the second pocket feature is greater than a second distance between the third pocket feature and the fourth pocket feature.

26. The rotor component of claim 25, wherein the second radial distance is greater than the first radial distance.

27. A rotor component configured for use in an axial flux motor or generator, comprising:

a support structure made of a magnetic material, the support structure forming an annulus;

a first magnet attached to a first portion of the support structure to form a first magnetic pole of the axial flux motor or generator, the first portion being a first angular portion of the annulus; and a second magnet attached to a second portion of the support structure to form a second magnetic pole of the axial flux motor or generator, the second portion being a second angular portion of the annulus;

wherein:

the magnetic material of the support structure provides a flux return path from the first magnet to the second magnet via the first portion and the second portion, the first portion of the support structure includes a first plurality of pocket features that are free of the magnetic material, the first plurality of pocket features includes at least a first pocket feature having a first closed perimeter at a surface of the first portion and a second pocket feature having a second closed perimeter at the surface of the first portion, the first pocket feature is located at a first radial distance from a center of the annulus, the second pocket feature is located at a second radial distance, different than the first radial distance, from the center of the annulus, and the first closed perimeter is greater than the second closed perimeter.

28. The rotor component of claim 27, wherein the first radial distance is greater than the second radial distance.

29. The rotor component of claim 27, wherein:

the first pocket feature has a first volume;

the second pocket feature has a second volume; and the first volume is greater than the second volume.

30. The rotor component of claim 29, wherein the first radial distance is greater than the second radial distance.

* * * * *